(12) United States Patent
Gustavsson

(10) Patent No.: US 8,950,736 B2
(45) Date of Patent: Feb. 10, 2015

(54) FREQUENCY TUNED DAMPER

(75) Inventor: Bengt-Göran Gustavsson, Bredaryd (SE)

(73) Assignee: Trelleborg Automotive Forsheda AB, Trelleborg (SE)

( * ) Notice: Subject to any disclaimer, the term of this patent is extended or adjusted under 35 U.S.C. 154(b) by 19 days.

(21) Appl. No.: 12/988,345

(22) PCT Filed: Mar. 19, 2009

(86) PCT No.: PCT/EP2009/002039
§ 371 (c)(1),
(2), (4) Date: Nov. 17, 2010

(87) PCT Pub. No.: WO2009/129901
PCT Pub. Date: Oct. 29, 2009

(65) Prior Publication Data
US 2011/0049776 A1 Mar. 3, 2011

(30) Foreign Application Priority Data
Apr. 22, 2008 (EP) .................................... 08154917

(51) Int. Cl.
*F16F 7/00* (2006.01)
*F16F 5/00* (2006.01)
*F16F 7/108* (2006.01)

(52) U.S. Cl.
CPC ........................................ *F16F 7/108* (2013.01)
USPC ........................................ 267/141; 267/140.13

(58) Field of Classification Search
CPC .......... F16F 15/1442; F16F 13/08; F16F 7/00
USPC .............. 267/140, 140.13, 141–141.5, 141.7, 267/140.11; 74/574.4
See application file for complete search history.

(56) References Cited

U.S. PATENT DOCUMENTS 3,196,710 A * 7/1965 Peirce ........................... 74/574.4
4,098,373 A * 7/1978 Troyer ........................... 188/379

(Continued)

FOREIGN PATENT DOCUMENTS

CN 2192848 Y 3/1995
CN 1629510 A 6/2005

(Continued)

OTHER PUBLICATIONS

International Preliminary Report on Patentability Appl. No. PCT/EP2009/002039.

(Continued)

*Primary Examiner* — Vishal Sahni
(74) *Attorney, Agent, or Firm* — Birch, Stewart, Kolasch & Birch, LLP

(57) ABSTRACT

The present disclosure relates to a frequency tuned damper having a vibration body in the form of a casing. The casing has first and second parts which partly enclose a connector part which extends through a connector opening in the casing, such that it can be attached to a surface, the vibrations of which is to be dampened. The casing and the connector part are interconnected by means of a resilient member in the casing interior. The first casing part is a can portion 31 and the second casing part is a lid portion 33. The can portion defines an internal space having a mounting opening at one end to receive the resilient member, and the lid portion is arranged to be attached to the can portion over the mounting opening in order to compress the resilient member into a compressed state in the internal space. The internal space substantially fully contains the resilient member in the compressed state. The lid portion may be produced as e.g. a punched sheet metal component which provides for an overall low cost damper.

30 Claims, 3 Drawing Sheets

(56) References Cited

U.S. PATENT DOCUMENTS

| | | | |
|---|---|---|---|
| 4,378,865 A * | 4/1983 | McLean | 188/379 |
| 4,850,243 A * | 7/1989 | George | 74/574.4 |
| 7,246,797 B2 * | 7/2007 | Gustavsson | 267/141.4 |
| 2004/0084820 A1 * | 5/2004 | Kato et al. | 267/141 |
| 2005/0066767 A1 * | 3/2005 | Patterson | 74/574 |
| 2008/0136073 A1 * | 6/2008 | Kreuzer | 267/140.11 |
| 2010/0140855 A1 * | 6/2010 | Gustavsson | 267/140.5 |

FOREIGN PATENT DOCUMENTS

| | | | |
|---|---|---|---|
| CN | 1888464 A | | 1/2007 |
| CN | 2886205 Y | | 4/2007 |
| CN | 200958542 Y | | 10/2007 |
| DE | 19856643 | * | 6/2000 |
| DE | 102005009677 A1 | | 9/2006 |
| DE | 2006016948 | * | 3/2007 |
| GB | 2179421 A | | 3/1987 |
| JP | 59-091985 U | | 6/1984 |
| JP | 06-080043 U | | 11/1994 |

OTHER PUBLICATIONS

International Search Report: PCT/EP2009/002039.

* cited by examiner

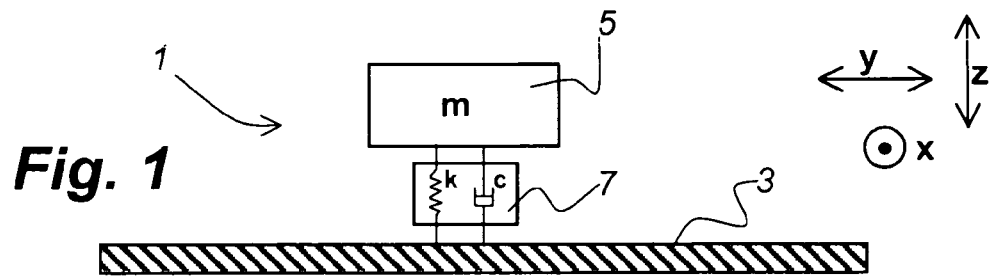
Fig. 1
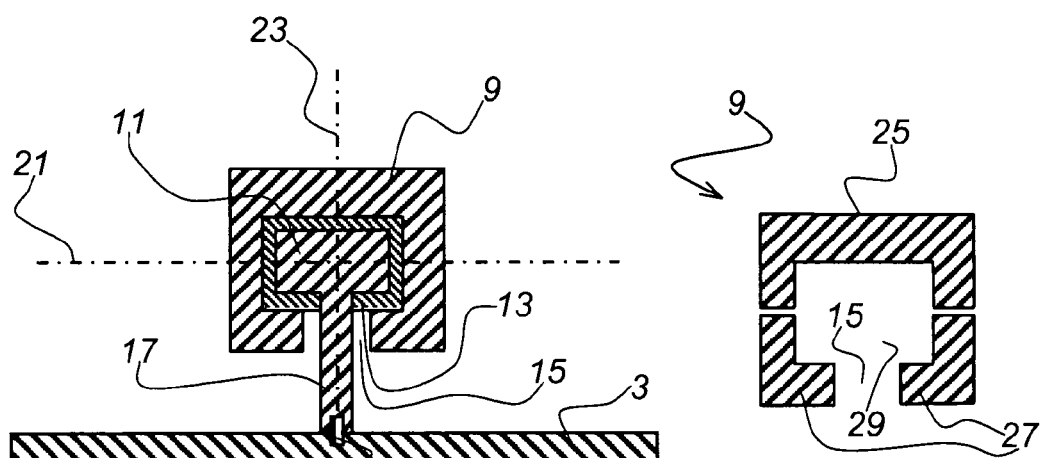
Fig. 2A
Fig. 2B
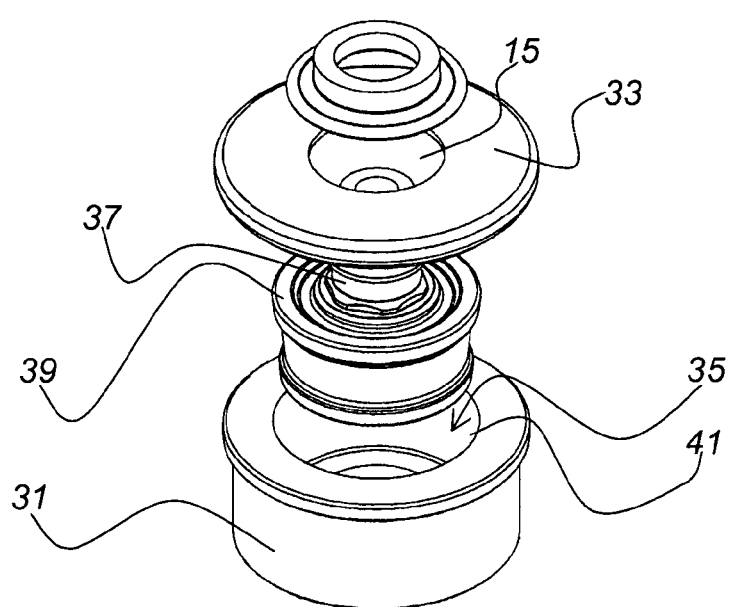
Fig. 3

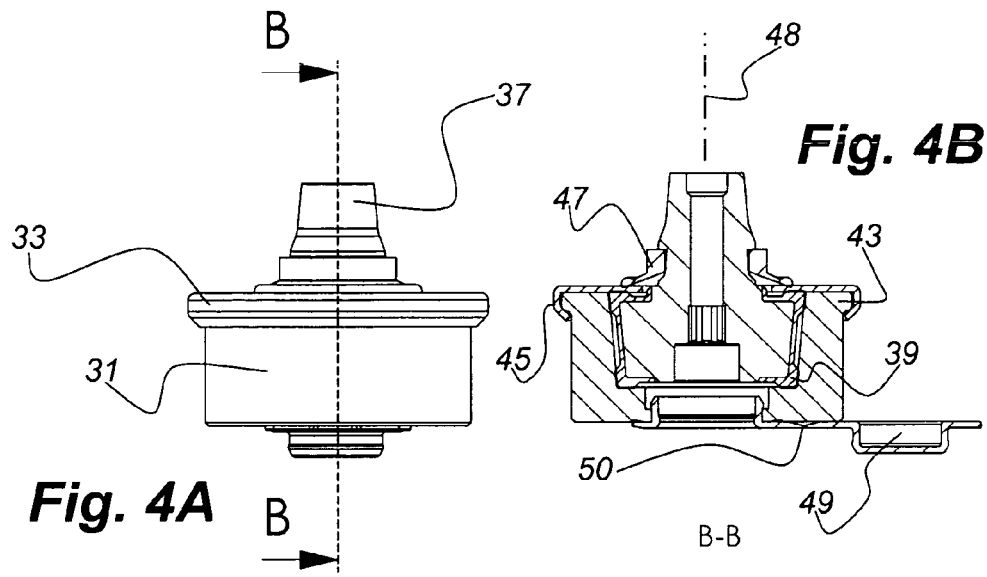
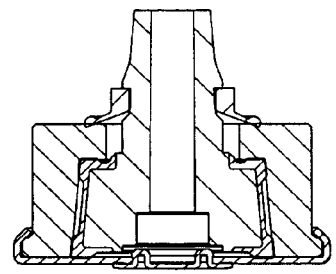
Fig. 5
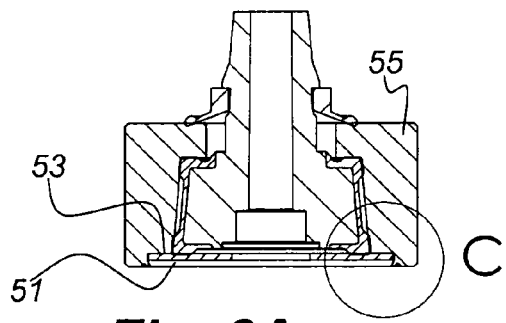
Fig. 6A
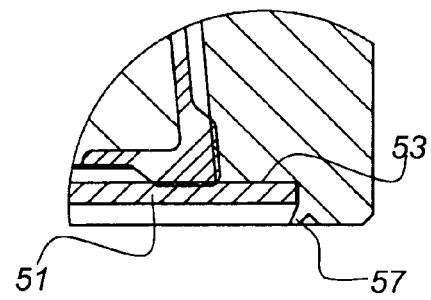
Fig. 6B

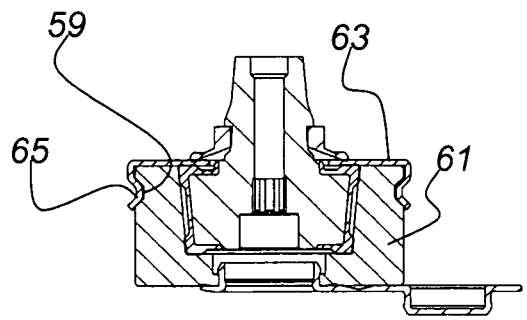 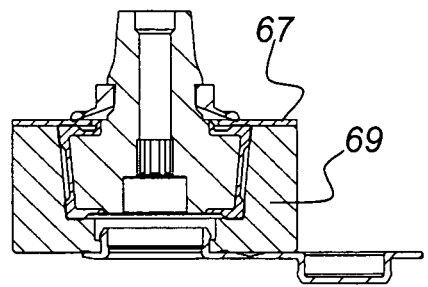
*Fig. 7*  *Fig. 8*
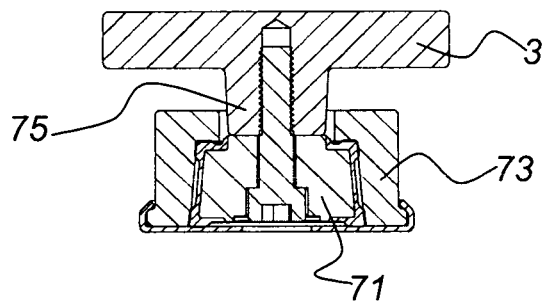
*Fig. 9*

FREQUENCY TUNED DAMPER

TECHNICAL FIELD

The present disclosure relates to a frequency tuned damper, for dampening vibrations in a surface, the damper comprising a vibration body in the form of a casing having a connector opening, a connector part, which is at least partly enclosed by the casing and connected to the casing via a resilient member in the interior of the casing, the connector opening to allowing the connector part to be attached to the surface, such that the casing is resiliently suspended from the surface, the casing having first and second parts.

BACKGROUND

Such a damper may be used e.g. in a vehicle to dampen vibrations in a part of the vehicle for instance when its engine runs at idle speed.

A general problem associated with such dampers is to reduce their production cost.

SUMMARY

An object of the present disclosure is to provide a frequency tuned damper of the initially mentioned kind that can be produced at a reduced cost.

This object is achieved by means of a frequency tuned damper as defined in claim 1. More specifically, the first casing part is then in the form of a can portion and the second casing part is a lid portion. The can portion defines an internal space having a mounting opening at one end to receive the resilient member. The lid portion is arranged to be attached to the can portion over the mounting opening such as to compress the resilient member into a compressed state in the internal space, and the internal space substantially fully contains the resilient member in the compressed state.

Such a damper allows the lid portion to be produced in e.g. sheet metal, for instance by a simple punching operation. Only one of the damper casing parts, the can portion, need be produced in a higher cost production method such as casting, machining, cold forming, or pressing of metal powder. Thereby a substantially less expensive damper may be provided as compared with a case where both casing parts would define a substantial portion of the casing's internal space and each would need a considerable weight.

The internal space may taper in the direction from the mounting opening. This compresses the resilient member also in the direction transverse to the direction of insertion, such that the damper can take deal with vibrations directed parallel with the plane of the vibrating surface. The internal space may for instance have the form of the frustum of a cone with a top angle less than 60°.

The connector opening may be located in the can portion or in the lid portion.

The lid portion may consist of sheet metal or plastic.

The can portion may consist of sintered metal powder or of machined, cast, or cold formed steel.

The can portion may comprise a circumferential edge portion forming a flange, and the lid portion may comprise a circumferential portion which is bent to enclose the flange, such that the lid portion is attached to the can portion.

Alternatively, the can portion may comprise a recess around the mounting opening, the lid portion may comprise a disc which fits in the recess, and the can portion may comprise a protrusion which is deformed to lock the lid portion in the recess such that the lid portion is attached to the can portion.

As another alternative, the can portion may comprise a circumferential recess, and the lid portion may comprise a circumferential portion, which is bent to be pressed into the recess, such that the lid portion is attached to the can portion.

As yet another alternative the lid portion may be attached to the can portion by one or more welded joints or by means of a glue joint.

The connector part may have a protruding portion, which extends through the connector opening.

BRIEF DESCRIPTION OF THE DRAWINGS

FIG. 1 illustrates schematically a frequency tuned damper.

FIG. 2A shows in cross-section schematically an outer-mass damper.

FIG. 2B Illustrates one way to provide a vibration body in the form of a casing, having a first and a second casing part.

FIG. 3 is an exploded view illustrating an outer-mass damper with a can and lid casing.

FIGS. 4A and 4B illustrate the damper of FIG. 3 when assembled.

FIG. 5 illustrates a first alternative example.

FIGS. 6A and 6B illustrate a second alternative example.

FIG. 7 illustrates a third alternative example.

FIG. 8 illustrates a fourth alternative example.

FIG. 9 illustrates a fifth alternative example.

DETAILED DESCRIPTION

The present invention relates in general to frequency tuned dampers. An example of such a damper 1 is schematically illustrated in FIG. 1. The damper 1 is used to dampen vibrations in a surface 3, and comprises a vibration body 5 and at least one elastic element 7, which are attached to the surface 3 and together provide a spring-mass system.

The mass m of the vibration body 5, and the stiffness k and damping c of the elastic element 7 are selected to provide a damping effect on the surface 3, which can be expected to vibrate at a predetermined target frequency. When the surface vibrates at this frequency, the vibration body is caused to oscillate at the same frequency as the surface but out of phase with the latter, such that the vibration of the surface is substantially dampened. The vibration body may vibrate with an amplitude substantially greater than the vibration amplitude of the surface. The general concept of a frequency tuned damper as illustrated in FIG. 1 is well known per se.

FIG. 2A shows in cross-section schematically a conceivable outer-mass damper. In such a damper, the vibration body (cf. 5, FIG. 1) is in the form of a casing 9, having an interior space. The casing 9 has a considerable mass and is intended to be resiliently suspended from a surface 3. The damper further has a connector part 11, which is partly enclosed by the casing 9 and is connected to the casing 9 via a resilient member 13 in the casing interior. The resilient member 13 constitutes the elastic element of FIG. 1. The casing has a connector opening 15, and the connector part 11 has a protruding portion 17 which extends through this opening 15 to allow the connector part 11 to be attached to the surface 3. Thereby the casing 9 can be resiliently suspended from the surface 3. The connector opening 15 is greater than the protruding portion 17 of the connector part 11 to provide room allowing the casing to vibrate in all dimensions. In any case the opening should be big enough to allow the movement of the casing relative to the connector part. The connector part 11 can be attached to the surface in a number of ways, typically using a screw 19.

As an alternative, a connector part without the protruding portion may be provided. Then, a projecting part integral with or attached to the surface to be dampened reaches through the connector opening and is attached to the connector part as will be shown in connection with FIG. 9.

An outer-mass damper can be very easily attached to the surface and does not take up much room. It may further deal with higher vibration frequencies.

The connector part 11 may be produced as a machined part, as a metal powder part or may be cold formed or cast. It may be circular symmetric with a symmetry axis 23 along which the connector part extends. The elastic element 13 may consist of rubber that is vulcanized to the connector part 11 or simply threaded thereon.

In order to allow an efficient production of the casing 9, and to allow the connector part 11 and the elastic element 13 to be fitted therein, the casing 9 may have first and second parts, which are joined when the damper is assembled. As illustrated in FIG. 2A, the casing 9 may thus be divided along the line 21. FIG. 2B accordingly shows a first 25 and a second 27 casing part, the connector opening 15 being located in the second part 27. The damper is assembled by sticking the protruding portion 17 of the connector part 11 from the interior 29 of the second part 27 through the connector opening 15. The first part 25 is then fitted on top of the upper part of the connector part 11, and the first and second parts 25, 27 are joined by means of bolts (not shown). Needless to say, there are different ways to carry out the assembling, typically to first fit the connector part 11 in the first casing part 25, and to join the first and second casing parts 25, 27, such that the protruding portion 17 (if any) extends through the connector opening 15.

The first and second parts may be produced as two die cast parts. This allows both parts to have a considerable weight. A die cast operation further allows the production of casing parts with details such as flanges provided with through holes at little extra cost, the through holes being used in the joining of the first and second parts during assembling of the damper. It should be noted, however, that the overall production cost of a die cast part may be relatively high.

The present disclosure provides an outer-mass damper that may be produced at a lower cost as compared with the damper schematically illustrated in FIGS. 2A and 2B.

Generally, as illustrated with a first example in FIG. 3, a first casing part is then a can portion 31 a second casing part is a lid portion 33. The can portion 31 defines an internal space 35 which will take up a connector member 37 and a resilient member 39 when the damper is assembled. The can portion 31 will usually have at least 80% of the total mass of the vibration body, i.e. leaving a maximum of 20% to the lid portion 33. The can portion therefore has relatively thick walls and may be produced e.g. by die casting (e.g. Zink), cold forming or machining (e.g. steel), or may be provided as a sintered metal powder component.

The can portion 31 has a mounting opening 41 at one end to receive the connector part 37 and the resilient member 39 when the damper is assembled. The internal space 35 of the can portion may be tapering from the mounting opening, and may have a frustoconical shape, as will be discussed later. The internal space 35 is further large enough to substantially fully contain the resilient member 39 in a state where the resilient member 39 is compressed.

The lid portion 33 is arranged to be attached to the can portion 31 over the mounting opening 41 when the connector member 37 and the elastic member 39 have been introduced into the internal space. The lid portion 33 then compresses the resilient member 39. The lid portion 33 can be attached to the can portion 31 in a number of ways as will be discussed further later.

Thanks to the use of a can portion 31 that is large enough to substantially contain the elastic member in the compressed state, the lid portion 33 can be provided as a relatively inexpensive part as compared to the can portion 31. The lid portion 33 may thus be made as a punched sheet metal component, with a thickness of e.g. 1-2 mm. If the sheet metal is steel, a high degree of compression of the resilient member 39 is allowed thanks to the strength of the lid portion. Then the damper may be capable of dealing with high frequencies, over the entire audible spectrum.

FIGS. 4A and 4B illustrate the damper of FIG. 3 when assembled, FIG. 4A being a side view of the generally circular symmetric damper, and FIG. 4B being a cross-section along the line B-B in FIG. 4A.

The amount of compression that the elastic member 39 is subjected to when the lid portion 33 is attached, is a factor determining the spring characteristics of the elastic member and hence the resonance frequency of the assembled damper. As illustrated, the inner space of the can portion 31 is tapering to some extent from the mounting opening such that the inner space has the form of a frustum of a cone. Thereby, the elastic member is also compressed to some extent in the radial direction, such that the damper can be made capable of dampening vibrations also in the radial directions (cf. x, y in FIG. 1).

The can portion 31 has a circumferential edge portion 43 forming a flange at the can portion periphery. The lid portion 33 has a circumferential portion 45 that is bent to enclose the edge portion 43 when the resilient member has been compressed in the interior of the casing, thereby attaching the lid portion 33 to the can portion 31. Further alternatives for attaching the lid portion to the can portion will be discussed later.

In the damper of FIGS. 4A and 4B, the connector opening 15 (cf. FIG. 3), through which the protruding portion of the connector part extends, is located in the lid portion 33. FIG. 5 illustrates a first alternative example where the connector opening 15 is instead located in the can portion 31. Returning to FIG. 4B, the connector opening is large enough to allow the connector part to move also in the radial direction. Radial and axial directions are here generally defined by the axis 48 along which the connector part 37 extends. In order to avoid contamination of the can portion's inner space the connector opening 15 is closed by means of a flexible seal 47, still allowing the connector part to move. The seal is however not necessary in many applications.

At the other end of the casing, a second opening is provided in the can portion which allows the insertion of a tool when the damper is mounted onto a surface. This second opening may thereafter be sealed e.g. by means of a plastic capsule 49. The capsule 49 may comprise two parts interconnected by a joint 50. A first ring-shaped part may be attached at the second opening, and a second, circular part may be inserted into the ring-shaped part when the second opening is to be sealed, by folding the capsule at the joint 50.

FIGS. 6A and 6B show a cross section of a second alternative example, FIG. 6B showing enlarged the portion C of FIG. 6A. In this example, the lid portion 51 is provided as a flat, circular disc part that may be inserted into a recess 53 in the can portion 55. A protrusion 57 at the boundary of the recess is then deformed to lock the lid portion 51 in the recess 53. The protrusion may be circumferential or may be provided at a plurality of locations along the boundary of the recess 53. The connector opening may be provided in the lid portion or, as shown, in the can portion.

FIG. 7 illustrates a third alternative example. This example is similar to the example of FIG. 4B, but the flange-like edge portion (cf. 43, FIG. 4B) of the can portion is replaced by a circumferential recess 59 around the outer periphery of the can portion 61. The lid portion 63 has a circumferential portion 65 that is bent to be pressed into the circumferential recess when the resilient member has been compressed in the interior of the casing, thereby attaching the lid portion 63 to the can portion 61. The connector opening may be provided in the can portion or, as shown, in the lid portion.

FIG. 8 illustrates a fourth alternative example. In this case, the lid portion is provided as a flat circular disc 67 having approximately the same width as the can portion 69. The disc 67 is welded to the can portion 69 when the elastic member is compressed therein. The connector opening may be provided in the can portion or, as shown, in the lid portion. Gluing may be an additional alternative, replacing the welding.

FIG. 9 illustrates a fifth alternative example. In this case, the connector part 71 does not have a protruding portion and is fully enclosed by the can portion 73. Instead, the surface 3, the vibrations of which are to be dampened, has a protruding portion 75 which connects with the connector part 71 in the can portion 73 interior. The can portion 73 has an opening large enough to allow movement of the can portion 73 relative to the protruding portion 75.

The invention is not restricted to the described embodiments and may be altered in different ways within the scope of the appended claims. For instance, even if the can portion described above has a circular cross-section, other examples are conceivable, e.g. an elliptic or even a rectangular cross section. Additionally, in some applications non-metal lid portions, e.g. plastic lid portions may be conceivable.

The invention claimed is:

1. A frequency tuned damper, for dampening vibrations in a surface, the damper comprising a vibration body in the form of a casing having a connector opening, a single connector part, which is at least partly enclosed by the casing and connected to the casing via a resilient member in the interior of the casing, said connector opening allowing the connector part to be connected to the surface, such that the casing is resiliently suspended from the surface, the casing having first and second parts, wherein the first casing part is a can portion and the second casing part is a lid portion, wherein the can portion defines an internal space having a first and a second end, the first end having a mounting opening to receive the resilient member and the second end of the internal space opposes the first end of the internal space, and the connector part occupies a great proportion of the internal space than the resilient member, the lid portion is arranged to be attached to the can portion over the mounting opening to compress the resilient member into a compressed state, said internal space is tapering in the direction from the mounting opening at the first end and has a frustoconical shape extending from the first end to the second end, and said internal space substantially fully contains the resilient member in the compressed state.

2. A frequency tuned damper according to claim 1, wherein the internal space has the form of the frustum of a cone with a top angle less than 60°.

3. A frequency tuned damper according to claim 1, wherein the connector opening is located in the can portion.

4. A frequency tuned damper according to claim 1, wherein the connector opening is located in the lid portion.

5. A frequency tuned damper a cording to claim 1, wherein the lid portion is made of sheet metal.

6. A frequency tuned damper a cording to claim 1, wherein the lid portion is made of plastic.

7. A frequency tuned damper according to claim 1, wherein the can portion is made of sintered metal powder.

8. A frequency tuned damper according to claim 1, wherein the can portion is made of machined, cast, or cold formed steel.

9. A frequency tuned damper according to claim 1, wherein the can portion comprises a circumferential edge portion forming a flange, and the lid portion comprises a circumferential portion which—bent to enclose the flange, such that the lid portion is attached to the can portion.

10. A frequency tuned damper according to claim 1, wherein the can portion comprises a recess around the mounting opening, the lid portion comprising a disc which fits in the recess, and the can portion comprises a protrusion which is deformed to lock the lid portion in the recess such that the lid portion is attached to the can portion.

11. A frequency tuned damper according to claim 1, wherein the can portion comprises a circumferential recess, and the lid portion comprises a circumferential portion which is bent to be pressed into the recess, such that the lid portion is attached to the can portion.

12. A frequency tuned damper according to claim 1, wherein the lid portion is attached to the can portion by one or more welded joints.

13. A frequency tuned damper according to claim 1, wherein the lid portion is attached to the can portion by mean of a glue joint.

14. A frequency tuned damper according to claim 1, wherein the connector part has a protruding portion, which extends through the connector opening.

15. A frequency tuned damper according to claim 1, wherein a portion of the outer surface of the resilient member is spaced from the inner surface of the can portion.

16. The frequency tuned damper according to claim 1, wherein the can portion and the lid portion vibrate in phase with each other.

17. A frequency tuned damper for dampening vibrations in a surface, the damper comprising:

a vibration body, the vibration body including a can portion, a lid portion, and a resilient member located between the can portion and the lid portion, the vibration body including a connector opening provided in one of the can portion and the lid portion; and a connector part at least partially received in the vibration body, the connector part having a first end connected to the resilient member and a second end extending through the connector opening to allow the vibration body to be connected to the surface, wherein the can portion includes a first end having a mounting opening and a second end opposite the first end, the can portion including an internal space between the first end and the second end to receive the resilient member through the mounting opening, wherein the lid portion is configured to be attached to the can portion over the mounting opening to compress the resilient member, wherein an outer surface of the resilient member substantially corresponds to an inner surface of the can portion, wherein the can is directly connected to the lid, and wherein an overall length of the connector part extending in the axial direction is greater than an overall width of the connector part in the radial direction.

18. The frequency tuned damper according to claim 17, wherein the can portion and the lid portion vibrate in phase with each other.

19. A frequency tuned damper for dampening vibrations in a surface, the damper comprising:

a vibration body, the vibration body including a can portion, a lid portion, and a resilient member located between the can portion and the lid portion, the vibration body including a connector opening provided in one of the can portion and the lid portion; and a connector part at least partially received in the vibration body, the connector part having a first end connected to the resilient member and a second end extending through the connector opening to allow the vibration body to be connected to the surface, wherein the can portion includes a first end having a mounting opening and a second end opposite the first end, the can portion including an internal space between the first end and the second end to receive the resilient member through the mounting opening, wherein the lid portion is configured to be attached to the can portion over the mounting opening to compress the resilient member, the lid portion having a greater diameter than a diameter of the can portion such that the lid portion extends beyond the can portion, and wherein the connector part occupies a greater proportion of the internal space than the resilient member.

20. A frequency tuned damper according to claim 19, wherein an outer surface of the can includes a flange and the lid portion wraps around the flange.

21. A frequency tuned damper according to claim 19, where the connector opening is formed in the lid portion.

22. The frequency tuned damper according to claim 19, wherein the can portion and the lid portion vibrate in phase with each other.

23. A frequency tuned damper for dampening vibrations in a surface, the damper comprising:

a vibration body, the vibration body including a can portion, a lid portion, and a resilient member located between the can portion and the lid portion, the vibration body including a connector opening provided in one of the can portion and the lid portion; and a connector part at least partially received in the vibration body, the connector part having a first end connected to the resilient member and a second end extending through the connector opening to allow the vibration body to be connected to the surface, wherein the can portion includes a first end having a mounting opening and a second end opposite the first end, the can portion including an internal space between the first end and the second end to receive the resilient member through the mounting opening, wherein the lid portion has a circumferential edge configured to be bent over an outer surface of the can portion to attach the lid portion to the can portion over the mounting opening so as to compress the resilient member, and wherein the connector part occupies a greater proportion of the internal space than the resilient member.

24. A frequency tuned damper according to claim 23, wherein an outer surface of the can includes a flange and the lid portion wraps around the flange.

25. A frequency tuned damper according to claim 23, where the connector opening is formed in the lid portion.

26. The frequency tuned damper according to claim 23, wherein the can portion and the lid portion vibrate in phase with each other.

27. A frequency tuned damper for dampening vibrations in a surface, the damper comprising:

a vibration body, the vibration body including a can portion, a lid portion, and a resilient member located between the can portion and the lid portion, the vibration body including a connector opening provided in one of the can portion and the lid portion; and a connector part at least partially received in the vibration body, the connector part having a first end connected to the resilient member and a second end extending through the connector opening to allow the vibration body to be connected to the surface, wherein the can portion includes a first end having a mounting opening and a second end opposite the first end, the can portion including an internal space between the first end and the second end to receive the resilient member through the mounting opening, the internal space having a first space including the mounting opening and a second space adjacent the first space, and a diameter of the first space is greater than a diameter of the second space, wherein the lid portion is inserted into the first space such that the resilient member is retained in the second space and the lid portion has a diameter that is greater than the diameter of the second space, and wherein the connector part occupies a greater proportion of the second space than the resilient member.

28. A frequency tuned damper according to claim 27, wherein the connector opening is formed in the second end of the can portion.

29. A frequency tuned damper according to claim 27, wherein the can portion includes a protrusion at the first space to retain the lid portion in the first space.

30. The frequency tuned damper according to claim 27, wherein the can portion and the lid portion vibrate in phase with each other.

* * * * *